United States Patent
Kearns et al.

(10) Patent No.: US 10,647,231 B2
(45) Date of Patent: May 12, 2020

(54) VENTILATED AIRLINE SEATING COMPONENT

(71) Applicant: B/E Aerospace, Inc., Wellington, FL (US)

(72) Inventors: Jason M. Kearns, Winston-Salem, NC (US); Michael M. Princip, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 123 days.

(21) Appl. No.: 15/862,168

(22) Filed: Jan. 4, 2018

(65) Prior Publication Data

US 2019/0202326 A1    Jul. 4, 2019

(51) Int. Cl.
*A47C 7/74* (2006.01)
*B60N 2/56* (2006.01)
*B64D 11/06* (2006.01)

(52) U.S. Cl.
CPC ......... *B60N 2/5657* (2013.01); *B60N 2/5685* (2013.01); *B64D 11/0626* (2014.12)

(58) Field of Classification Search
CPC .................................................... B60H 2/5657
USPC .............................. 454/120, 907; 297/180.14
See application file for complete search history.

(56) References Cited

U.S. PATENT DOCUMENTS

| 6,003,950 A * | 12/1999 | Larsson | A47C 7/74 |
| | | | 297/452.42 |
| 2007/0176471 A1* | 8/2007 | Knoll | B60N 2/5635 |
| | | | 297/180.14 |
| 2016/0236598 A1* | 8/2016 | Hoshi | B60N 2/5685 |

* cited by examiner

*Primary Examiner* — Vivek K Shirsat
(74) *Attorney, Agent, or Firm* — Clements Bernard Walker Law

(57) ABSTRACT

A ventilated airline seating component including a porous air pad disposed in an interior volume of a housing and configured to collect air to be conditioned and ultimately forced out through the seating component to heat or cool a passenger to enhance comfort. The housing can serve as or be incorporated into a seating component such as an arm rest, leg rest or head rest, among other seating components within a passenger seating environment.

16 Claims, 8 Drawing Sheets

VENTILATED AIRLINE SEATING COMPONENT

BACKGROUND

Passenger seats and passenger seating environments aboard conveyances are commonly equipped with features designed to enhance passenger comfort. Regarding airliners, to which the inventive concepts disclosed herein find particular application, such features can include adjustable seats, ottomans, audio/video equipment, working/dining tables, lighting, etc. While significant effort has been directed to enhancing the aforementioned features, little effort been spent attempting to control the delivery of air and air temperature within the passenger seating environment, and particularly air and temperature control for each individual passenger.

Air delivery and temperature control aboard airliners has been conventionally limited to adjustable nozzles positioned overhead, and electric heaters incorporated into the seating surfaces. While overhead nozzles are able to control the flow of air directed to a passenger, they disadvantageously affect surrounding passengers and are not able to control the temperature of the delivered air. While electric heaters are able to control the surface temperature of a seat surface, they are slow to react to temperature change requests and are unable to cool the seat surface. Therefore, what is needed is a system capable of providing warm or cold air, on demand, and through a seating component in order to better regulate body temperature, sweating and anxiety, thus producing a more comfortable and enjoyable flight for passengers.

SUMMARY

In one aspect, embodiments of the inventive concepts disclosed herein are directed to a ventilated seat component assembly including a seat component housing having an interior volume and an air inlet port, a porous air pad disposed in the interior volume of the seat component housing and including an air collection portion for collecting supplied air to be conditioned and a perforated top portion through which conditioned air exits the porous air pad, a heating element disposed in the interior volume, an air duct coupled to the seat component housing for supplying air to the interior volume through the air inlet port, an air supply hose coupled to the air duct, and a fan coupled to the air supply hose.

In a further aspect, the assembly may include a perimeter seal disposed between an outer perimeter of the porous air pad and an inner wall of the seat component housing such that air supplied to the interior volume of the seat component housing is directed through and exits the porous air pad as conditioned air.

In a further aspect, the air collection portion of the porous air pad may be a multi-layer fiber web.

In a further aspect, the heating element may be wired heated coil layer adhered to a bottom face of the porous air pad.

In a further aspect, the seat component housing may be at least a portion of an arm rest and the perforated top portion may be a perforated arm rest cover.

In a further aspect, the seat component housing may be at least a portion of a leg rest and the perforated top portion may be a perforated leg rest cover.

In a further aspect, the seat component housing may be at least a portion of a head rest and the perforated top portion may be a perforated head rest cover.

In a further aspect, the seat component housing may be adapted to be disposed in a passenger seating environment to supply conditioned air to the passenger seating environment.

In a further aspect, the porous air pad may be disposed atop the air inlet port and the air duct may include an air outlet tube oriented to direct air to the air pad for collection and conditioning.

In another aspect, embodiments of the inventive concepts disclosed herein are directed to a ventilated airline seating component including a housing forming part of a passenger seat component and having an interior volume and an air inlet port, a porous air pad disposed in the interior volume of the housing and including an air collection portion for collecting supplied air to be conditioned and a perforated top portion through which conditioned air exits the porous air pad, a heating element disposed in the interior volume, an air duct coupled to the seat component housing for supplying air to the interior volume through the air inlet port, and an air supply hose coupled to the air duct.

In another aspect, embodiments of the inventive concepts disclosed herein are directed to a ventilated airline seating component including a housing forming part of a passenger seat component and housing having an air inlet port and an interior volume through which forced air respectively enters the housing and is collected, a porous air pad disposed in the interior volume of the housing and comprising an air collection portion for collecting the forced air to be conditioned and a perforated top portion through which conditioned air exits the housing, and a heating element disposed in the interior volume of the housing, wherein the air inlet port and the porous air pad are arranged such that the forced air entering the housing is directed through and exits the porous air pad as conditioned air.

In a further aspect, the passenger seat component may be at least one of an arm rest, a leg rest, and a head rest.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to ventilated airline seating components, for example arm rests, leg rests and head rests, wherein air flows through and out of the seating component to provide ventilation, which can be air-conditioned to cool overheated passengers or heated to warm and comfort colder passengers. Air to be conditioned is collected within the seating component long enough to be conditioned before eventually being forced out through the seating component.

Figure 1:
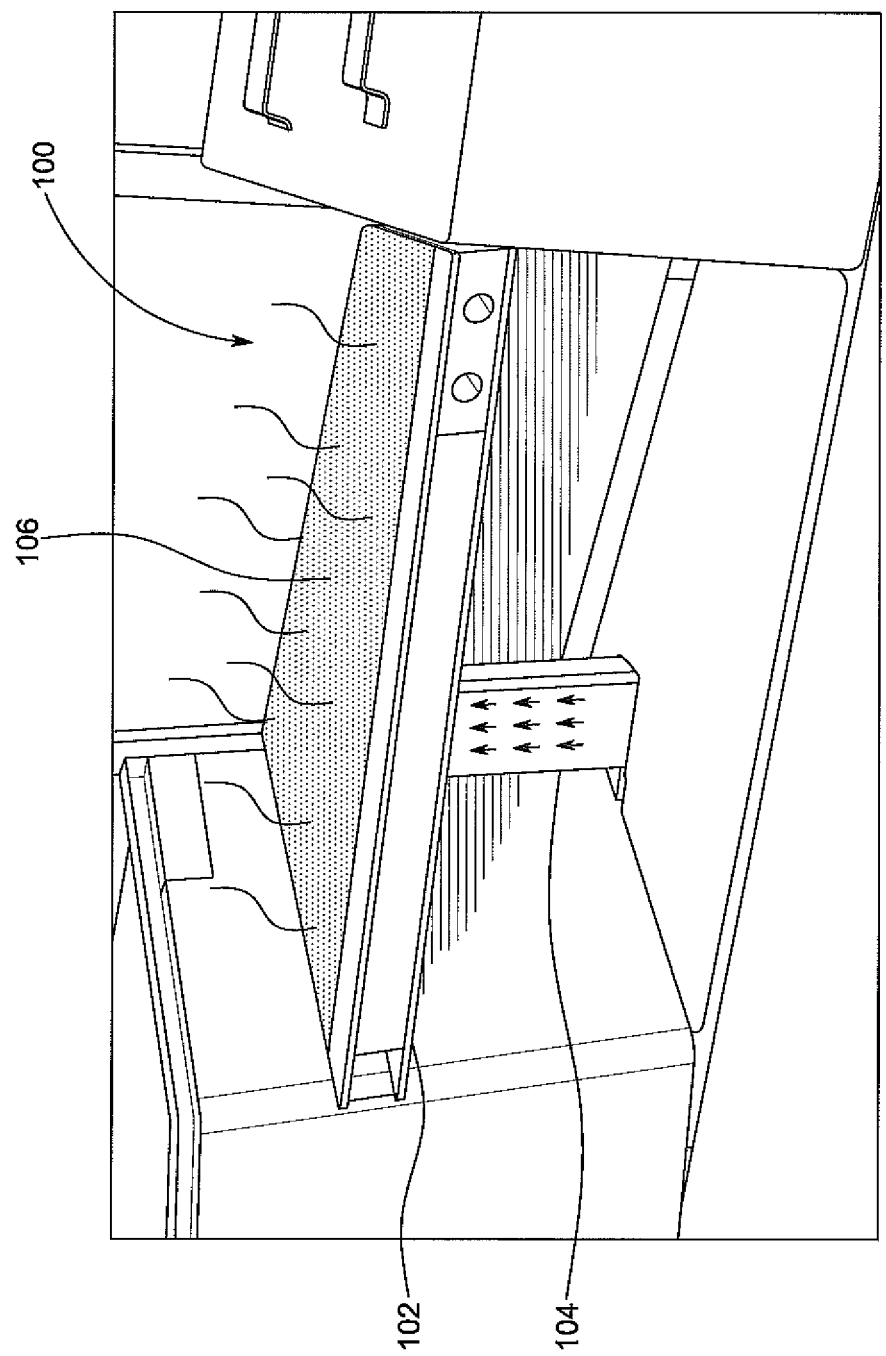
FIG. 1 is perspective view of a portion of a passenger seating environment showing a ventilated seat component incorporated into an arm rest.

In an exemplary embodiment, FIG. 1 discloses a ventilated seating component incorporated or embodied in a passenger arm rest assembly 100. The arm rest assembly 100 can be independent of a passenger seat to which it serves and disposed laterally adjacent thereto. As shown, the arm rest assembly 100 can be disposed alongside a seat within a nook defined between furniture and/or suite defining structures. Portions of the arm rest assembly 100 can be vertically adjustable, for example, to support a passenger's arm when in a raised position and form part of a lie flat bed to extend the surface area thereof when in a lowered position. The arm rest assembly 100 generally includes a housing 102, also referred to herein as the "component housing" and "seat component housing", supported atop an air duct 104. The housing 102 can be topped or capped with a perforated top cover 106 through which conditioned air ultimately exits the arm rest assembly 100.

Figure 2:
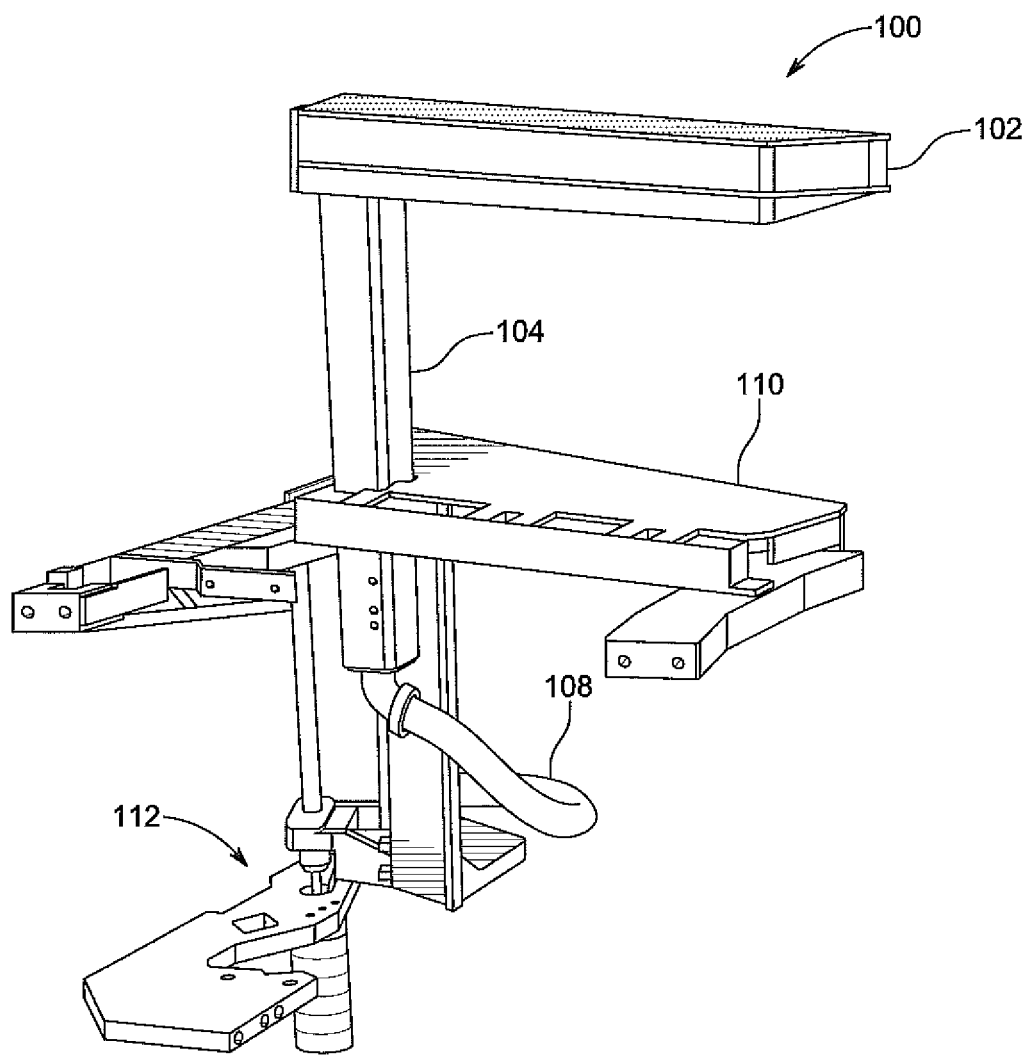
FIG. 2 is a perspective view of a ventilated seat component assembly in the form of an adjustable arm rest.

Referring to FIG. 2, the arm rest assembly 100 generally includes the housing 102, the air duct 104 coupled to the housing 102, and an air supply hose 108 coupled to the air duct 104. In one embodiment, the air duct 104 and the air supply hose 108 may each serve to route air. In an alternative embodiment, the air duct 104 may be a conduit through which the air supply hose 108 is routed. Thus, the air duct 104 itself may or may not rout air to the housing 102. The air duct 104 is a rigid conduit that serves as a structural support member for the housing 102, while the air supply hose 108 is flexible to allow routing between the air duct 104 and a fan.

The housing 102 is supported atop the air duct 104. As shown, the longitudinal axis of the housing 102 is oriented perpendicular to the longitudinal axis of the air duct 104. In this arrangement, the housing 102 can be packaged in a thin elongate body that can seat flush against a top surface of a plate 110 when the housing 102 is fully lowered. The plate 110 can be a structural support member and can support the vertical orientation of the air duct 104. The air duct 104 can be vertically adjustable relative to the plate 110, for example, utilizing an actuator driven mechanism 112 or like mechanism. A majority or all or the plate 110 and actuator driven mechanism 112 can be concealed from view when fully assembled within the passenger seating environment. For example, the top surface of the plate 110 can remain exposed when the housing 102 is elevated with respect thereto, while everything below the top surface of the plate is packaged within the passenger seating compartment.

Figure 3:
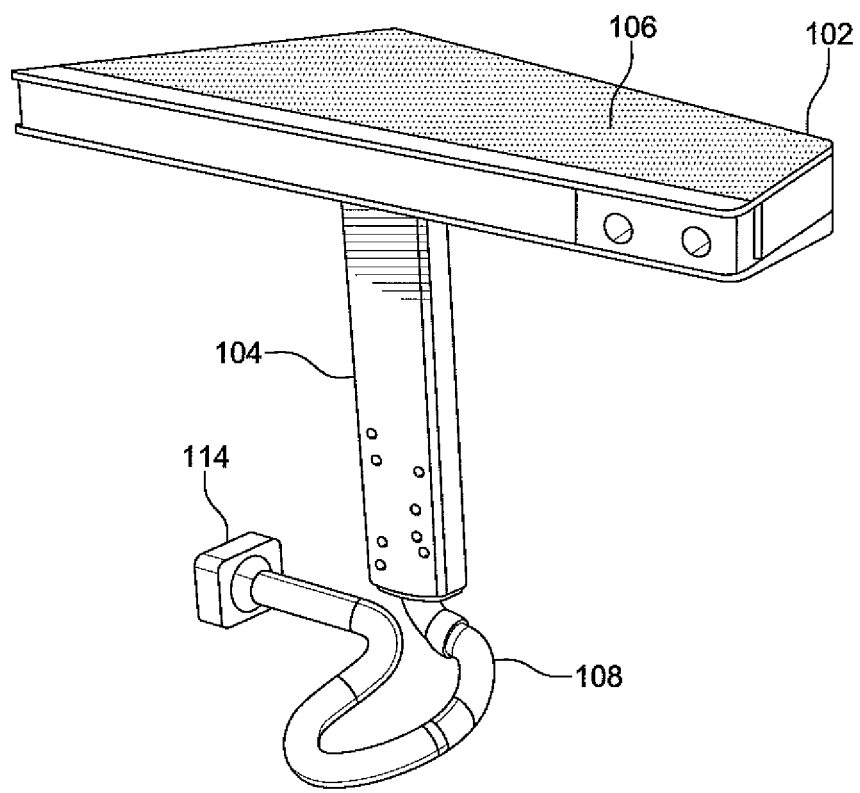
FIG. 3 is a perspective view of a ventilated arm rest assembly.

Referring to FIG. 3, the housing 102 can be embodied in a thin elongate package with a customizable shape not limiting or critical to the inventive concept. The top of the housing 102 can be a perforated top cover 106 through which conditioned, or unconditioned, air is ultimately forced out through into the passenger seating environment. The perforated top cover 106 can be the top upholstered cover of the arm rest or can be covered with a perforated upholstery covering such as fabric, leather, etc.

A fan 114 is coupled to a receiving end of the air supply hose 108 and is operable for forcing air through the air supply hose and ultimately out through the top cover 106. In one embodiment, conditioned air in the form of air-conditioned or cold air can be supplied to the fan 114, which forces the cold air through the air supply hose 108, followed by the air duct 104, into the housing 102, and ultimately out through the top cover 106. In another embodiment, unconditioned air can be supplied to the fan 114, which forces the unconditioned air through the air supply hose 108, followed by the air duct 104, into the housing 102 where the air is conditioned, and ultimately out through the top cover 106.

Figure 4:
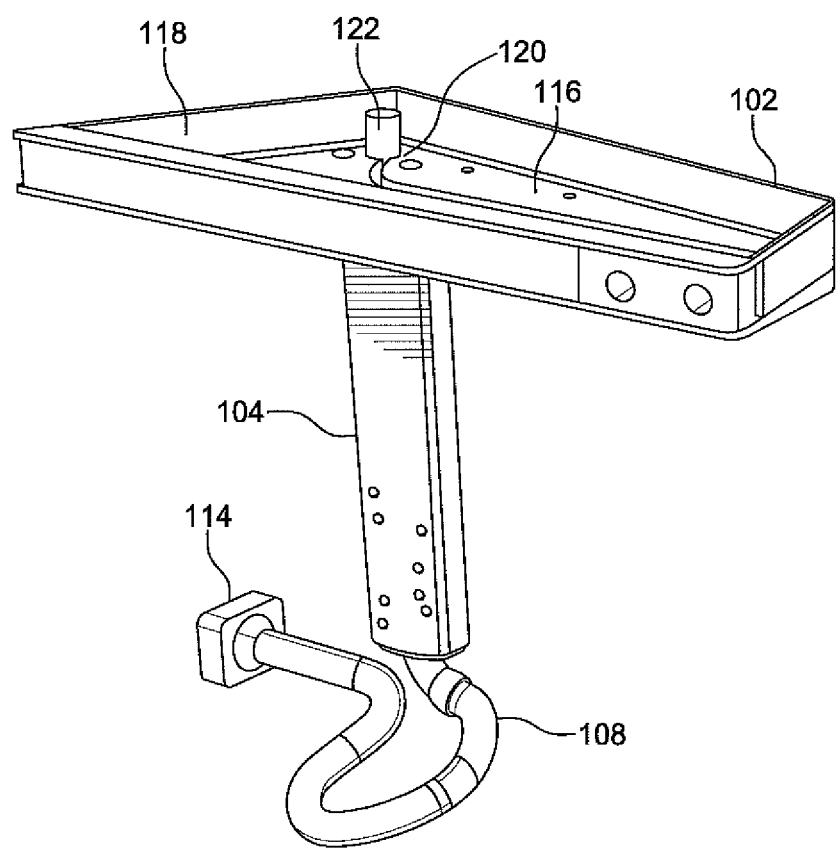
FIG. 4 shows the arm rest assembly of FIG. 3 with the porous air pad and heating element removed.

Referring to FIG. 4, the housing 102 can be a tray having a bottom 116, upstanding sidewalls 118, and an open top closed which is closed by the top cover, shown removed. The housing 102 can be a rigid body made of plastic or other durable and lightweight material. The housing 102 has an interior volume sufficient to accommodate a volume of supplied air conditioned or to be conditioned. An inlet port 120 opens through the bottom 116 of the housing 102 and an air outlet 122 delivers air to the interior volume. The air outlet 122 can be part of the air duct 104 or the supply hose 108.

Figure 5:
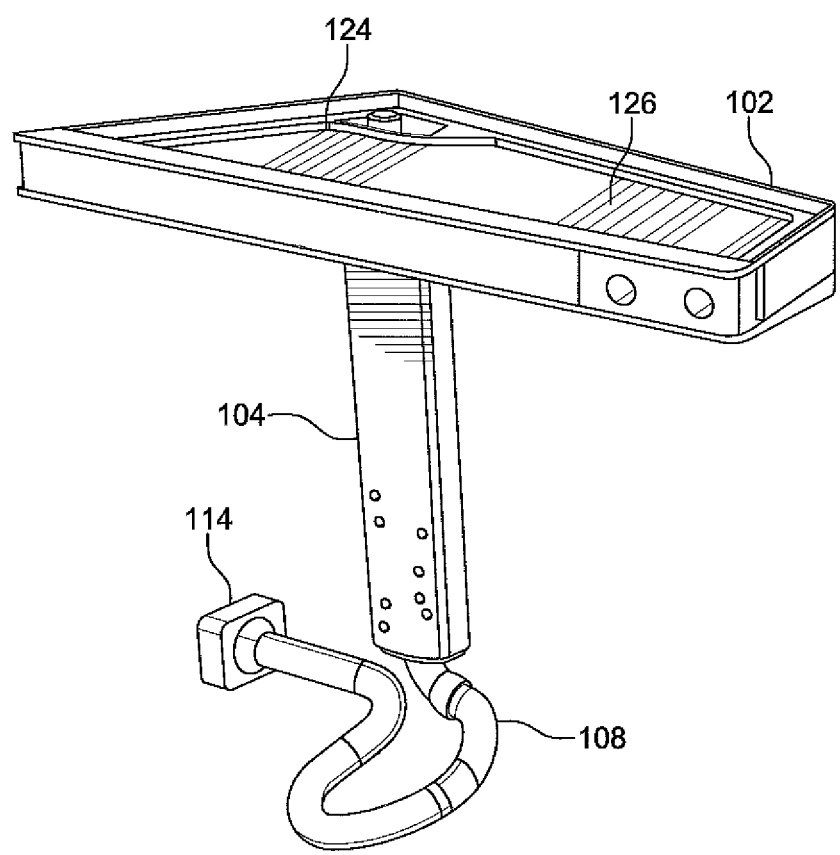
FIG. 5 shows the arm rest assembly of FIG. 3 with the porous air pad removed.

Referring to FIG. 5, a heating element 124 is disposed within the interior volume of the housing 102 operable for heating air supplied to the interior volume to a predetermined temperature to be delivered as conditioned air through the top cover. The heating element 124 can be embodied in a wired heated coil layer adhered to a face of the porous air pad, discussed in detail below. The heating element 124 can be operable for converting electricity into heat through resistive heating or like processes. As shown, the heating element 124 can be shaped to conform to the shape of the housing and can include perimeter and crossing portions 126 to promote even heating and heat distribution throughout the interior volume.

Figure 6:
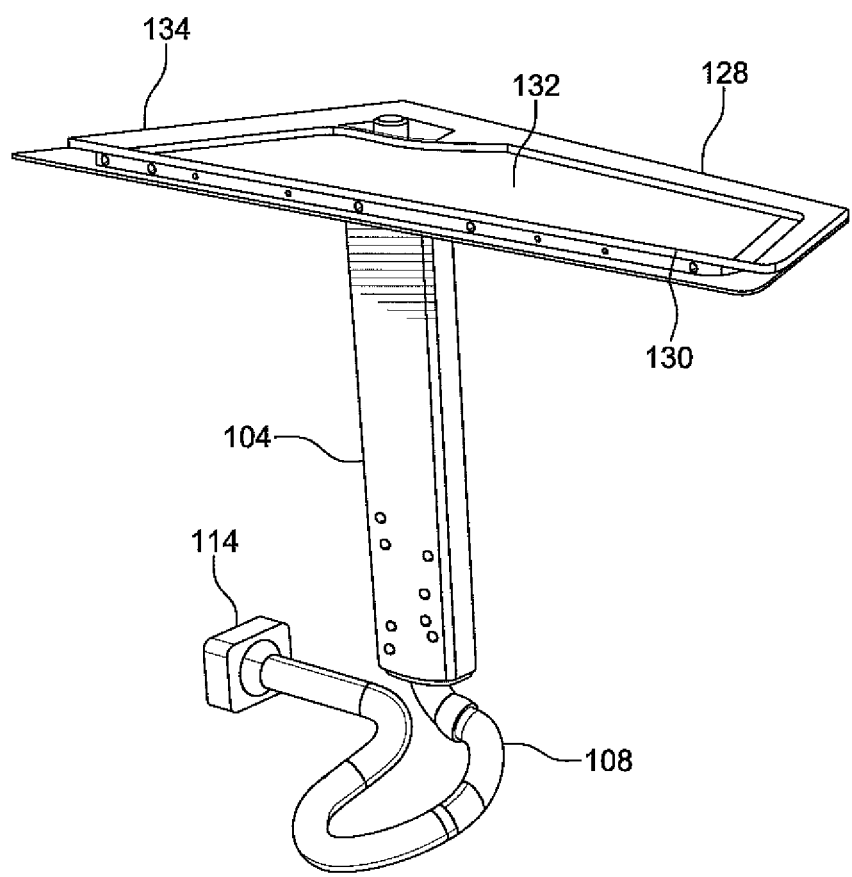
FIG. 6 shows the arm rest assembly of FIG. 3 with the housing and perforated cover removed.

Referring to FIG. 6, with the housing shown removed, a porous air pad 128 is disposed in the interior volume of the housing 102. The porous air pad 128 generally includes an air collection portion 130 for collecting supplied air to be conditioned, and a perforated top portion 132 through which conditioned air exits the porous air pad 128. In one embodiment, the perforated top portion 132 can be the perforated top cover 106. In another embodiment, the perforated top portion 132 of the porous air pad is covered by the perforated top cover 106 with the perforations thereof aligned such that conditioned air is allowed to flow unobstructed through each into the cabin environment.

In a specific embodiment, the air collection portion 130 of the porous air pad 128 can be a multi-layer fiber web. The construction of the air collection portion 130 is such that air entering the air collection portion 130 is collected therein for a time sufficient to condition the air to a predetermined temperature, for example, heat the collected air to a temperature selected by the seated passenger. The air collection portion 130 can include a plurality of interconnected compartments and/or air flow passages for slowing or delaying the flow of air from the interior volume ultimately out through the top cover 106. Air entering the interior volume of the housing 102 can, in a particular embodiment, be required to pass through the porous air pad 128 before exiting through the top cover 106. The required pathway increases the time the air is in contact with radiant heat from the heating element 124, which can be in the form of heat directly from the heating element 124 and/or from the heated porous air pad 128.

A perimeter seal 134 can be disposed between an outer perimeter of the porous air pad 128 and an inner surface of the sidewalls of the housing such that air supplied to the interior volume of the housing is required to pass through the porous air pad 128 in order to exit the assembly.

Figure 7:
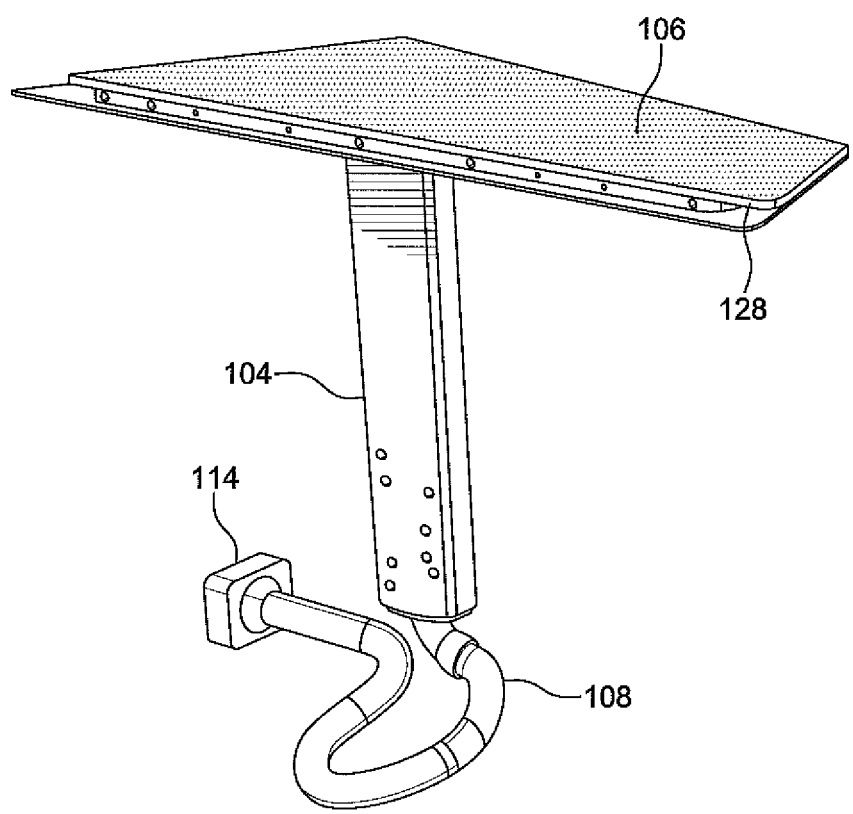
FIG. 7 shows the arm rest assembly of FIG. 3 with the housing removed.

The heating element 124 can be disposed below or adhered to the bottom of the porous air pad 128 such air enters the interior volume through the air inlet port 120, flows upward into the porous air pad 128 where it is collected and conditioned (e.g. warmed), and ultimately flows out through or is forced through the perforated top cover 106. FIG. 7 shows the perforated top cover 106 attached to the top surface of the The fan 114 can be adjustable such that the volume of air flow through the assembly 100 can be controlled based on system demand, passenger preference, etc. The assembly 100 can further include a thermostat electrically coupled to at least one of the fan and the heating element operable for sensing the temperature of the conditioned air and controlling the heating element and/or operation of the fan in response thereto. For example, demand on the system in response to a passenger request for heated air may activate the fan and heating element. Passenger control can include at least one of temperature adjustment and fan speed.

Figure 8:
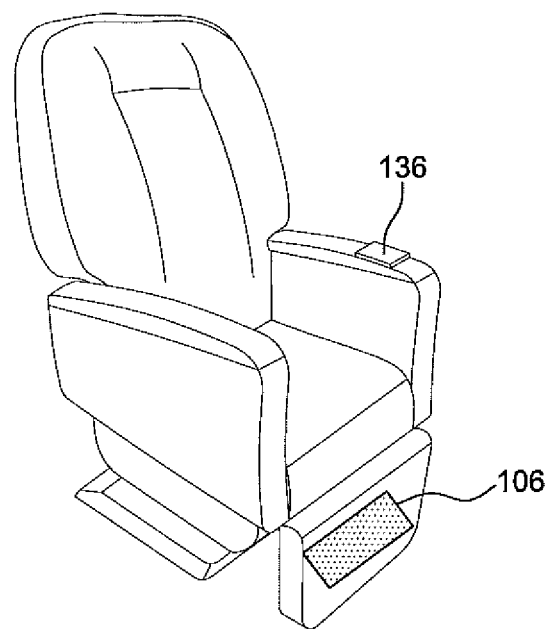
FIG. 8 shows the ventilated seat component incorporated into a leg rest.
Figure 9:
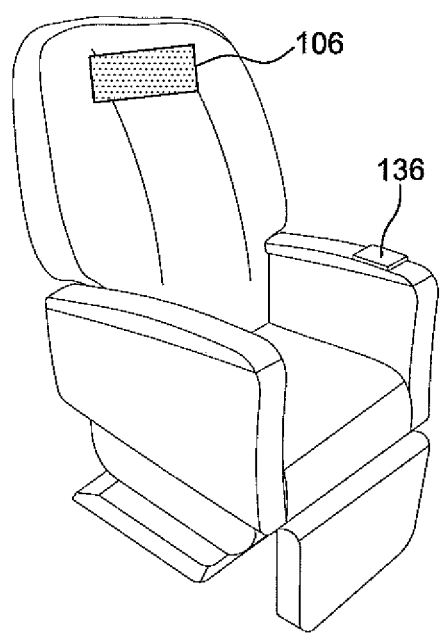
FIG. 9 shows the ventilated seat component incorporated into a head rest.

The assembly 100 is not limited to an arm rest and thus can be embodied in other seating components including, but not limited to, a leg rest as shown in FIG. 8 or a head rest as shown in FIG. 9. In these alternative embodiments, the assembly is concealed within the seating component with the exception of the perforated top cover 106 presented through all of part of the seating component. For example, the perforated top cover 106 may form all or a discrete part of the leg rest or head rest. The assembly can be controlled through a control interface 136 located, for example, in the seat arm rest. Assemblies described herein may be utilized in seating components in direct contact with the passenger to focus conditioned air directly onto the passenger, or can be utilized in any location within the seating environment to introduce conditioned air.

Various aspects of the assemblies described herein may be modified depending on, for example, the seat component to be equipped with the assembly, location of the fan relative to the porous air pad, need to supply cooled air, etc.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A ventilated seat component assembly, comprising:
   a seat component housing formed as a tray having an interior volume, an air inlet port, and a perforated top cover;
   a porous air pad disposed in the interior volume of the seat component housing, the porous air pad comprising an air collection portion for collecting supplied air to be conditioned and a perforated top portion through which conditioned air exits the porous air pad;
   a heating element disposed in the interior volume positioned against a bottom of the porous air pad;
   an air duct coupled to the seat component housing for supplying air to the interior volume through the air inlet port, the air duct supporting the seat component housing and the air duct and the seat component housing positionally adjustable relative to a support plate;
   an air supply hose coupled to the air duct; and
   a fan coupled to the air supply hose for forcing air into the air duct,
   wherein the forced air enters the interior volume from the air duct through the air inlet port and flows into the porous air pad to be conditioned and passively flows out of the porous air pad through the perforated top portion and out of the seat component housing through the perforated top cover.

2. The ventilated seat component assembly of claim 1, further comprising a perimeter seal disposed between an outer perimeter of the porous air pad and an inner wall of the seat component housing such that air supplied to the interior volume of the seat component housing is directed through and exits the porous air pad as conditioned air.

3. The ventilated seat component assembly of claim 1, wherein the heating element is adhered to a bottom face of the porous air pad.

4. The ventilated seat component assembly of claim 1, wherein the seat component housing comprises at least a portion of an arm rest and the perforated top cover is a perforated arm rest cover.

5. The ventilated seat component assembly of claim 1, wherein the seat component housing comprises at least a portion of a leg rest and the perforated top cover is a perforated leg rest cover.

6. The ventilated seat component assembly of claim 1, wherein the seat component housing comprises at least a portion of a head rest and the perforated top cover is a perforated head rest cover.

7. The ventilated seat component assembly of claim 1, wherein the seat component housing is adapted to be disposed in a passenger seating environment to supply conditioned air to the passenger seating environment.

8. The ventilated seat component assembly of claim 1, wherein the porous air pad is disposed atop the air inlet port and the air duct comprises an air outlet tube oriented to direct air to the air pad for collection and conditioning.

9. A ventilated airline seating component, comprising:
   a housing formed as a tray forming part of a passenger seat component, the housing having an interior volume and an air inlet port, and the housing having a perforated top cover;
   a porous air pad disposed in the interior volume of the housing, the porous air pad comprising an air collection portion for collecting supplied air to be conditioned and a perforated top portion through which conditioned air exits the porous air pad;
   a heating element disposed in the interior volume positioned against a bottom of the porous air pad;
   an air duct coupled to the seat component housing for supplying air to the interior volume through the air inlet port, the air duct supporting the housing and the air duct and the housing positionally adjustable relative to a support plate; and
   an air supply hose providing forced air to the air duct,
   wherein the forced air enters the interior volume from the air duct through the air inlet port and flows into the porous air pad to be conditioned and passively flows out of the porous air pad through the perforated top portion and out of the housing through the perforated top cover.

10. The ventilated airline seating component of claim 9, further comprising a perimeter seal disposed between an outer perimeter of the porous air pad and an inner wall of the housing such that air supplied to the interior volume of the housing is directed through and exits the porous air pad as conditioned air.

11. The ventilated airline seating component of claim 9, wherein the heating element is adhered to a bottom face of the porous air pad.

12. The ventilated airline seating component of claim 9, wherein the housing comprises at least a portion of an arm rest and the perforated top cover is a perforated arm rest cover.

13. The ventilated airline seating component of claim 9, wherein the housing comprises at least a portion of a leg rest and the perforated top cover is a perforated leg rest cover.

14. The ventilated airline seating component of claim 9, wherein the housing comprises at least a portion of a head rest and the perforated top cover is a perforated head rest cover.

15. The ventilated airline seating component of claim 9, further comprising a fan adapted to force air through, in sequence, the air supply hose, the air supply duct, and the porous air pad.

16. The ventilated airline seating component of claim 9, wherein the porous air pad is disposed atop the air inlet port and the air duct comprises an air outlet tube oriented to direct air to the air pad for collection and conditioning.

* * * * *